(12) United States Patent
Kato et al.

(10) Patent No.: US 6,567,373 B1
(45) Date of Patent: May 20, 2003

(54) OPTICAL HEAD

(75) Inventors: Kenji Kato, Chiba (JP); Manabu Oumi, Chiba (JP); Yasuyuki Mitsuoka, Chiba (JP); Nobuyuki Kasama, Chiba (JP); Takashi Niwa, Chiba (JP); Susumu Ichihara, Chiba (JP)

(73) Assignee: Seiko Instruments Inc. (JP)

( * ) Notice: Subject to any disclaimer, the term of this patent is extended or adjusted under 35 U.S.C. 154(b) by 2 days.

(21) Appl. No.: 09/807,771
(22) PCT Filed: Aug. 23, 2000
(86) PCT No.: PCT/JP00/05668
§ 371 (c)(1),
(2), (4) Date: Jun. 4, 2001
(87) PCT Pub. No.: WO01/16949
PCT Pub. Date: Mar. 8, 2001

(30) Foreign Application Priority Data

Aug. 30, 1999 (JP) .............................................. 11-242916
Apr. 27, 2000 (JP) ....................................... 2000-127325

(51) Int. Cl.[7] .................................................. G11B 15/64
(52) U.S. Cl. ...................................................... 369/300
(58) Field of Search ................................. 369/300, 244, 369/112.01, 99

(56) References Cited

U.S. PATENT DOCUMENTS

| | | | |
|---|---|---|---|
| 5,351,229 A | * 9/1994 | Brezoczky et al. | 369/99 |
| 6,473,384 B1 | * 10/2002 | Oumi et al. | 369/112.01 |
| 6,473,389 B2 | * 10/2002 | Hirai et al. | 369/244 |
| 6,480,459 B2 | * 11/2002 | Budde | 369/244 |

\* cited by examiner

Primary Examiner—Allen Cao
(74) Attorney, Agent, or Firm—Adams & Wilks (57) ABSTRACT

An optical head for optical recording/reading apparatus, which records and reads information with high reliability, by making use of an optical interaction with a medium in a minute area, on a high density medium revolving at high speed. It has a structure, in which an optical waveguide mechanism applies a loading force to a slider 6 receiving a buoyant force, and a system for introducing a light to the slider 6 and a system for applying the loading force are integrated into an identical body. As the result, a stable posture regulation of the slider 6 and an increase of the light intensity of irradiation on the medium can be achieved, and it becomes possible to record and read information with high reliability. Furthermore, by disposing a minute structure in the vicinity of an edge in the surface facing the medium of the slider 6, so that the minute structure can come closer to the medium, further improvement in high density can be made.

24 Claims, 11 Drawing Sheets

OPTICAL HEAD

TECHNICAL FIELD

The present invention relates to an optical head for an information recording/reading apparatus, in which high density information can be recorded and read by making use of an optical interaction in a minute area on a medium to read structural or optical information formed on the minute area or record such information on the minute area.

BACKGROUND OF THE INVENTION

The development of information recording/reading apparatus using light is evolving toward the direction of larger capacity and smaller size, and thus a higher density of recording bits has been demanded. As a measure for achieving that, techniques using a violet semiconductor laser or SIL (solid immersion lens) have been under study. However, in those techniques, the improvement of recording density can be expected to be only several times that of the existing recording denisty, because of the problem of diffraction limit of light. Instead of that, as a technique that handles the optical information of such minute area beyond the diffraction limit of light, an information recording/reading method making use of a near-field light is expected.

This method makes use of a near-field light, which is generated by an interaction between a minute area and an optical aperture having a size smaller than the wavelength of light. This method enables the handling of optical information in an area having a size less than the wavelength of light, which would be beyond a limit of the conventional optical system. Replaying of the optical information is performed by converting a great amount of near-field light, which localizes on the surface of the recording medium by irradiating a scattering light, and is converted into a bound ray by the interaction with a minute aperture (collection mode), and reading the data stored on the minute area on the medium. Furthermore, it is also possible to read by irradiating the near-field light generated form a minute aperture on a surface of a medium, and detecting the scattered light converted by the intersection with minute unevenness on the surface of the medium, on which the information has been recorded, with a detector provided separately (illumination mode). Recording is performed by irradiating a near-field light generated from a minute aperture on a surface of the recording medium to vary the configuration of a minute area on a medium (heat mode recording), or to vary a refractive index or transmittance of the minute area (photon mode recording). By using such a head having an optical minute aperture, which is sized less than the diffraction limit of light, the high density optical information recording/reading apparatus, in which the density of recording bits exceeds that of the conventional optical information recording/reading apparatus, can be realized.

The structure of the recording/reading apparatus making use of a near-field light is almost the same as that of magnetic disc apparatus, except that a near-field light head is used instead of a magnetic head. A slider attached to the distal end of a suspension arm and provided with an optical minute aperture optical is kept floating at a certain height by the flying-head technology, and a desired data mark existing on a disc is accessed. In order to make the near-field light head follow the high speed revolution of the disc, a flexible-posture function is provided for stabilizing the posture of the slider with respect to the undulation of the disc. In such a structure of a near-field light head, as the method of feeding light to the slider, means for connecting optical fibers or an optical waveguide to the slider or arm, or means for irradiating a beam of laser, which is disposed horizontally to the slider or above the slider, directly on the slider has been employed.

However, when a light is incident on such a structure, since a structural body such as optical fibers or an optical waveguide is connected between the slider and the arm, it becomes an obstacle to the free motion of the slider, and causes the posture control of the slider with respect to the motion of disc to be difficult and the distance between the disc and the slider cannot be kept constant. As a result, the SN ratio of the output from the optical information written on the disc is deteriorated, and there have been difficulties in writing and reading signals. Furthermore, when the signal is incident on the slider directly from a laser disposed above the slider, from the necessity of synchronizing the incident light with the raped motion of the slider, it is required to provide an additional structural body, which can follow the motion of the slider, and it has been extremely difficult. Moreover, by providing such an additional structural body, the apparatus itself becomes larger in size, and it has made the recording/reading apparatus more difficult to be miniaturized.

DISCLOSURE OF THE INVENTION

In order to solve the above-described problems, an optical head for recording and reading information is provided which is comprised of a slider that receives a buoyant force by means of relative motion with respect to a medium a, minute structure formed on the slider, in a surface facing the medium, for at least one of generating or detecting a near-field light, an in-slider optical waveguide mechanism formed on the slider and connected optically to the minute structure, an arm for holding the slider and applying a loading force to the slider; an in-arm optical waveguide mechansim formed on the arm for guiding a light to the in-slider optical waveguide mechanism, and an optical waveguide mechanism that contacts the in-arm optical waveguide mechansim and contacts the in-slider optical waveguide mechanism and contacts the in-slider optical waveguide mechanism, wherein a loading force is applied to the slider through the optical waveguide mechanism.

Furthermore, it is characterized in that the optical waveguide mechanism and the in-arm optical waveguide mechanism are formed in one united body.

Furthermore, it is characterized in that the optical waveguide mechanism and the in-slider optical waveguide mechanism are formed in one united body.

Furthermore, it is characterized in that an area where the optical waveguide mechanism contacts the in-arm optical waveguide mechanism or an area where the optical waveguide mechanism contacts the in-slider optical waveguide mechanism or both areas of those are extremely small.

Still furthermore, it is characterized in that the optical waveguide mechanism contacts the in-arm optical waveguide mechanism or the in-slider optical waveguide mechanism or both of those, at one point.

According to the present invention, it is possible that the light from the arm side is transmitted to the slider with certainty and, at the same time, the obstacle to the free motion of the slider, which would be caused by the structural body that guides a light to the slider, is eliminated, and the posture of the slider is controlled freely in response to the motion of the medium, while keeping the distance between the medium and the slider scanning on the medium constant. As a result, signals can be input and output with a high SN ratio and stability. Moreover, since the optical waveguide mechanism that transmits a light and the slider are minute structural bodies, which are produced by a micro-machining process using silicon or the like, the suspension function of the arm is not obstructed and the overweight nature of the slider has no influence on its motion. Accordingly, the entire apparatus can be miniaturized. Moreover, since the entire optical head or at least a great portion thereof is produced by a mass production line with semiconductor processes, its cost can be made lower.

Furthermore, an optical head is characterized in that the optical waveguide mechanism has a part shaped like a cone or a hanging bell having a pointed top, and contacts at the part.

Furthermore, it is characterized in that the optical waveguide mechanism has a part shaped as a part of spherical surface and contacts at the part.

Furthermore, it is characterized in that the optical waveguide mechanism has a part having a condensing function.

By making the optical design of the optical waveguide according to the present invention, it is possible that a light is transmitted to the slider with certainty and a large amount of light is supplied to the slider. Furthermore, by adjusting the spherical shape, the conical shape or the refractive index of the optical waveguide, it is possible to collect more light around a minute aperture formed in the slider for generating a near-field light. As the result, signals can be input and output with a high SN ratio, and an apparatus having a high reliability can be produced.

Moreover, an optical head is characterized in that the loading force is applied toward the center of gravity of the slider, and the minute structure that exists in a surface facing the medium is positioned on a straight line, which links the point the slider receives the loading force with the center of gravity.

Furthermore, it is characterized in that the minute structure is positioned in the vicinity of an edge of a surface facing the medium, depending on the shape of the slider or its density distribution or the combination of those.

Furthermore, it is characterized in that there exists a recess having a size corresponding to ⅕ or more of the volume of the slider, at a portion in a surface opposite to the surface facing the medium of the slider.

Furthermore, it is characterized in that there exists a difference in thickness having a differential level corresponding to ¹⁄₁₀ or more of the averaged thickness of the slider, in a surface facing the medium of the slider.

Still furthermore, it is characterized in that a material having a density different from that of the slider occupies ¹⁄₁₀ or more of the total volume of the slider.

According to the present invention, although the posture of the floating slider inclines slightly with respect to the medium surface, due to an air pressure distribution that the surface facing the medium of the slider receives by the high speed motion of the medium, the aperture can be disposed at a region close to the medium in the surface facing the medium of the slider, and thereby further more minute recording and reading becomes possible. Moreover, by bringing the aperture closer to the medium, SN ratio in recording and reading can be improved, and an information recording/reading apparatus having high stability and reliability can be produced. Furthermore, resulting from the improved SN ratio, a high-speed recording/reading becomes possible without a necessity of the large-powered light source, and thereby a small-sized, thin type and low-priced information recording/reading apparatus can be produced.

BEST MODE FOR CARRYING OUT THE INVENTION

Embodiment 1

Figure 1:
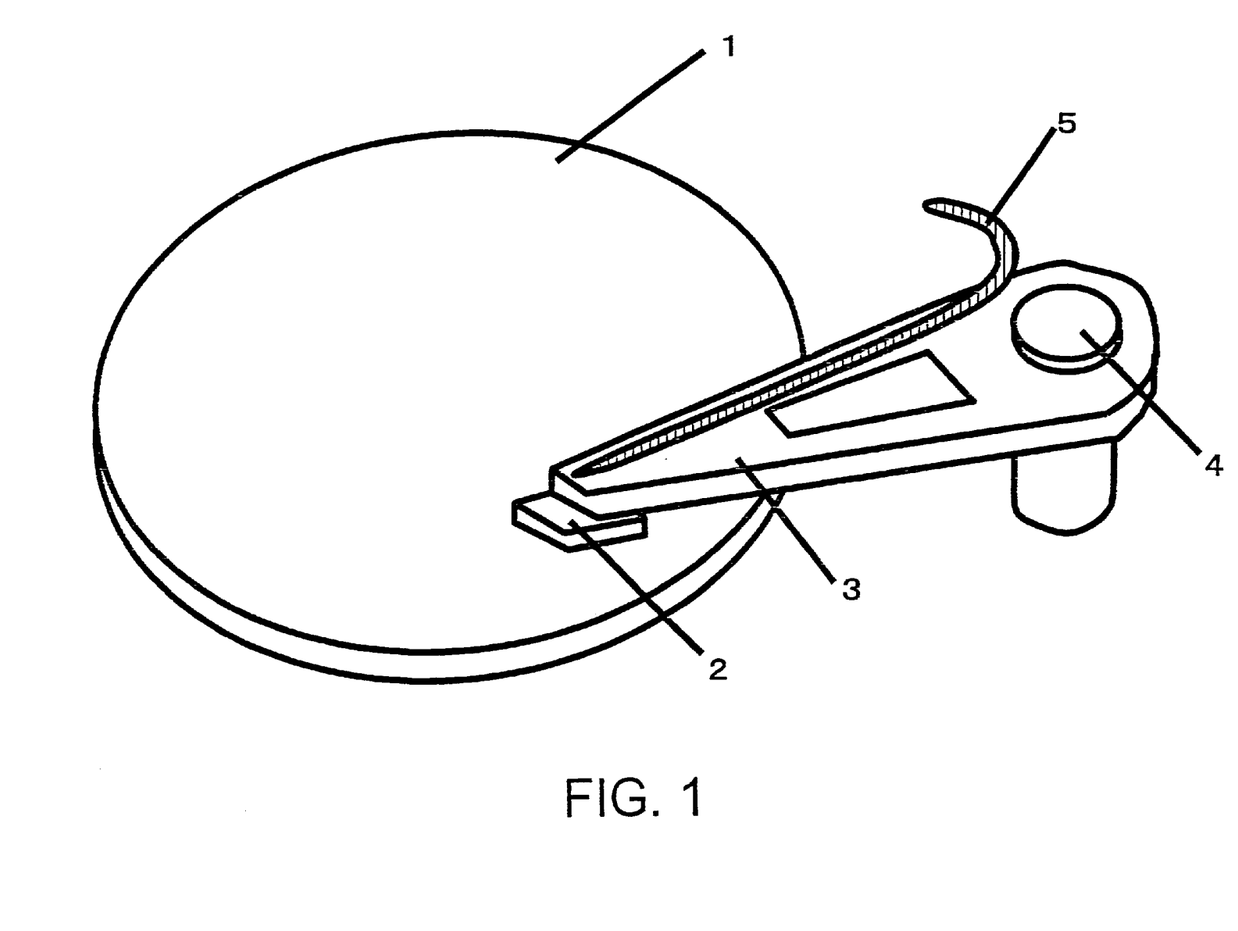
FIG. 1 is a rough sketch showing an example of the optical storing/reading apparatus according to the embodiment 1 of the present invention.

FIG. 1 shows a rough sketch of an example of the optical storing/reading apparatus according to the embodiment 1 of the present invention. On a disc 1 (medium) revolving at high speed, a slider 2 is provided which is kept at a certain distance from the disc 1 by a buoyant force produced by the hydrodynamic motion generated by the revolution and a loading force produced by the arm 3. The slider 2 is held at the distal end portion of the arm 3, and can scan to a desired position on the disc 1 by moving horizontally the arm 3 about a rotation axis 4 coupled with a motor. The light propagated an optical waveguide 5 on the arm 3 passes through an optical waveguide in the slider 2, is converted into a near-field light by a minute aperture formed in a surface facing a disc of the slider 2, and is irradiated on the disc 1. Scattered light generated by the interaction between this near-field light and a minute area on the surface of the disc 1 is converted into an electric signal by a light sensing device disposed within or near the slider 2, and supplied to a signal processing circuit, where the information of the minute area is read.

Figure 2:
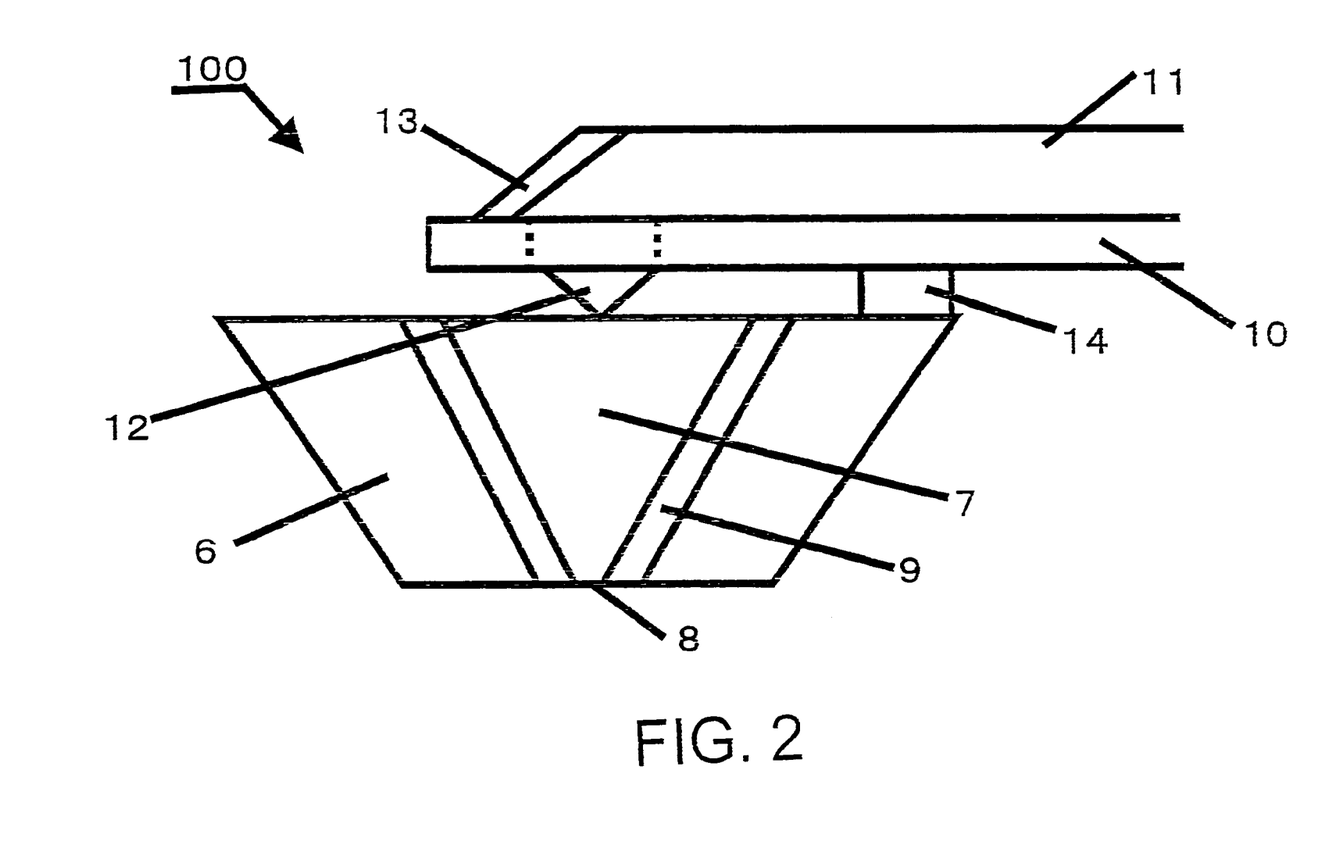
FIG. 2 is a diagram showing a structure of the optical head according to the embodiment 1 of the present invention.

FIG. 2 shows a structure of the optical head according to the embodiment 1 of the present invention. The optical head 100 of this structure is composed of: a slider 6 having a minute aperture 8 and an in-slider optical waveguide 7 is formed therein; a holding member 14 for holding the slider 6; an in-arm optical waveguide 11 including a weighting member 12 for applying a loading force to the slider 6; and an arm 10, in which the in-arm optical waveguide 11 is formed. The slider 6 is disposed close to the distal end of the arm 10 and under the arm 10. Although the in-arm optical waveguide 11 is formed on top of the arm 10 in FIG. 2, it may be also formed in the arm 10 or under the arm 10.

The light to be irradiated on the medium propagates through the in-arm optical waveguide 11 formed on the arm 10, and is guided to above the slider 6. Above the slider 6, a light reflector surface 13 for deflecting the direction of light propagation, is formed at a portion of the in-arm optical waveguide 11, so that the light guided to above the slider 6 is deflected in its direction and is further guided to the in-slider optical waveguide 7 formed in the slider 6. At that time, the light propagates through a protruded weighting member 12, which is formed of a portion of the in-arm optical waveguide 11 and applying a loading force to the slider 6. By adjusting the light refractive index, the taper angle of sloping surface and the shape of protrusion of the weighting member 12, the light, which propagated through the in-arm optical waveguide 11, was reflected by the light reflector surface 13 and spread, is condensed, and introduced into the in-slider optical waveguide 7. In the slider 6, which is connected with the arm 10 via the holding member 14, there exists an inverse-cone shaped hole having a minute aperture 8 for detecting and generating a near-field light at the vertex of the conical shape of the hole, and the in-slider optical waveguide 7 is embedded within the hole. The light, which has been introduced into the in-slider optical waveguide 7 via the weighting member 12, is condensed around the minute aperture 8, by the effect of a light reflecting surface 9 formed within the inverse-cone shaped hole with surrounding the in-slider optical waveguide 7. The condensed light is converted into a near-field light by passing through the minute aperture 8, and irradiated on a minute area formed on the medium. Although the above description has been made for the illumination mode, it can be also applied similarly to the collection mode, in which the near-field light is detected, and similar effect can be obtained.

The slider 6 receives a buoyant force from the medium side, by the hydrodynamic motion of air generated by the high speed revolution of the medium. By applying a loading force from the arm 10 having a suspension function to the slider 6 receiving the buoyant force, the distance between the medium and the minute aperture 8 for causing an interaction of near-field light can be kept in a constant level, and thereby recording and reading the accurate information can be performed based on the intensity distribution of the near-field light generated by the aperture. The slider 6 must be continually regulated in a proper posture in response to the undulation of medium surface, to keep its relative position constant, and it is an effective method to make the slider 6 adapt to the motion of medium by applying the loading force at one point on the center of gravity. In the embodiment 1 according to the present invention, the weighting member 12 for applying the loading force is formed of a portion of the in-arm optical waveguide 11. The weighting member 12 is pressing the center of gravity of the slider 6 with the pointed vertex of the inverse-cone shaped protrusion, so that the slider 6 can be always regulated in a proper posture with respect to the motion of medium, and, at the same time, is also playing a role of guiding the light from the arm 10 side to the slider 6 side. For the purpose of that, even if the slider 6 moved its position slightly for adjusting its posture, the relative position between the in-arm optical waveguide 11 pressing the gravity center of the slider and the in-slider optical waveguide 7 being pressed is always the same, and thereby a stable and constant amount of light can be supplied.

The arm and the slider composing such a structure can be produced by the micro-machining process that is represented by that of silicon. In the case of the slider, for example, the inverse-conical hole can be formed on a silicon substrate, which is the parent body of the slider, by an anisotropic etching method, and an optical minute aperture is formed at the vertex thereof. A laminated layer of an optical waveguide material for guiding the light to the aperture is produced, by laminating a high-reflectance material inside the hole. On the other hand, in the case of the arm, a material to be the optical waveguide is formed on a metal material, which have been formed so as to have a shape of the arm, and, by etching or by exposing and developing in a manner of photo-lithographic technique, a desired shape of the optical waveguide is produced. As described above, by making use of such a micro-machining process that is represented by the semiconductor industry, mass production is made easier, and thereby the miniaturization and mass production of the slider and the arm can be easily realized. Moreover, by further adding the improvement in the higher density of recording bits and in the smaller diameter of discs, the miniaturization and the lighter weight of the optical recording/reading apparatus can be realized.

As described above, in the optical head according to the embodiment 1, although it has a simple structure, it is possible that the posture of the slider is controlled freely according to the undulation of the disc surface, in response to the motion of medium revolving at a high speed, by forming the weighting member for applying a loading force to the slider with a portion of the optical waveguide, and that the distance between the disc and the slider is kept constant. At the same time, a stable and constant amount of light can be continually supplied from the minute aperture, by arranging the relative position between the in-arm optical waveguide and the in-slider optical waveguide to be constant. Moreover, as the effect by the configuration given to the optical waveguide or the effect of condensing light by adjusting the refractive index, sufficient amount of light can be supplied from the minute aperture to the medium, and thereby stable recording and reading the signals having a high SN ratio can be realized.

Embodiment 2

Figure 3:
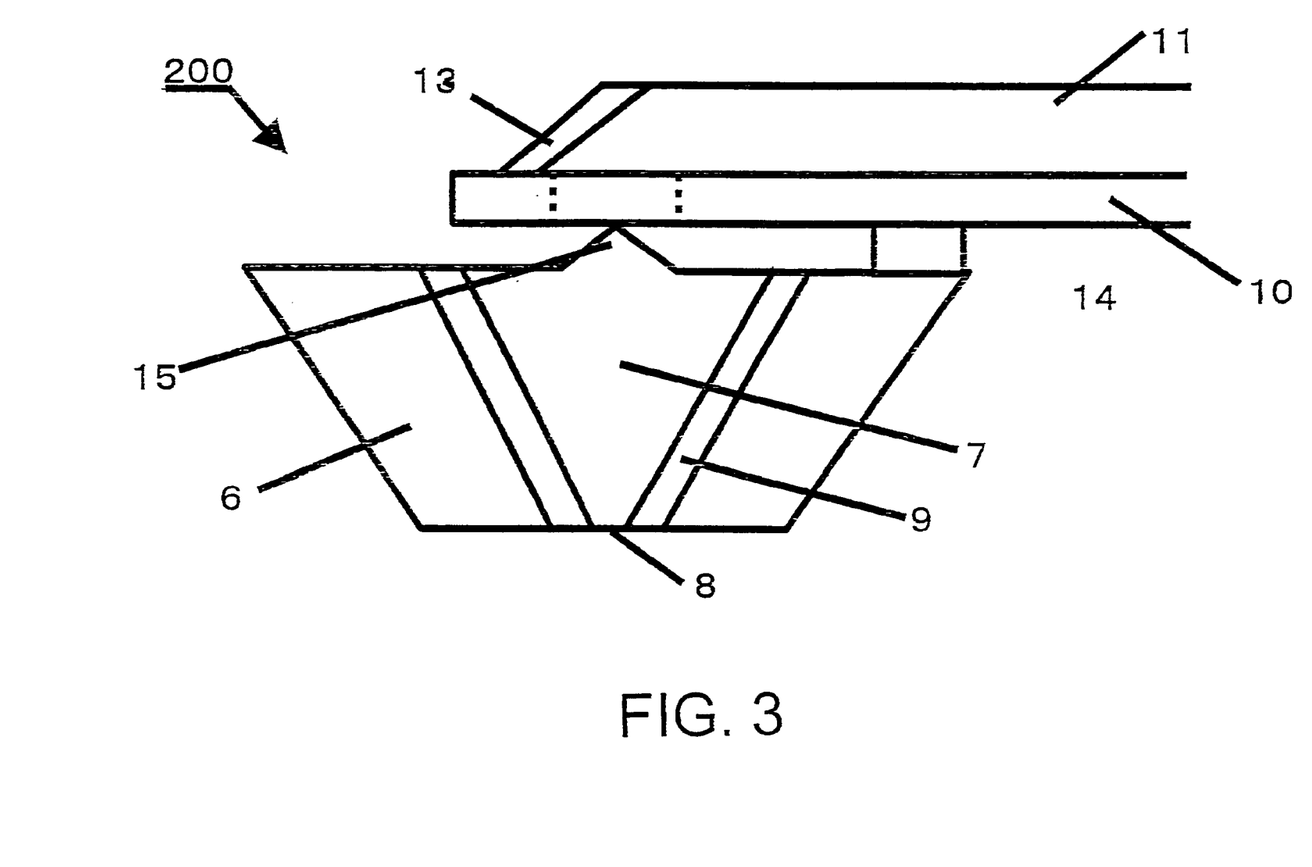
FIG. 3 is a diagram-showing a structure of the optical head according to the embodiment 2 of the present invention.

FIG. 3 shows a structure of the optical head according to the embodiment 2 of the present invention. The optical head 200 of this structure is composed of: a slider 6 having a minute aperture 8 and an in-slider optical waveguide 7, which is provided with a weight-receiving member 15 at a portion, is formed therein; a holding member 14 for holding the slider 6; an in-arm optical waveguide 11 for applying a loading force to the slider 6; and an arm 10, in which the in-arm optical waveguide 11 is formed. Although the rough structure is similar to the embodiment 1, it is characterized in that a projection for receiving the loading force from the in-arm optical waveguide 11 is formed on the in-slider optical waveguide 7. Also in FIG. 3, the in-arm optical waveguide 11 may be formed anywhere of the arm 10, i.e., on top of, in or under the arm 10, similarly to FIG. 2.

The weight-receiving member 15 formed of a portion of the in-slider optical waveguide 7 is shaped conical, and contacts the in-arm optical waveguide 11 at the vertex of the cone. The light, which has been reflected by the light reflector surface 13 and is to be transmitted toward the slider 6, comes incident on the weight-receiving member 15 formed of a portion of the in-slider optical waveguide 7, with keeping stability, and is guided to the minute aperture 8. Similarly to the embodiment 1 by adjusting the incident angle to the weight-receiving member 15 and its refractive index, the light incident on the in-slider optical waveguide 7 can be condensed to the minute aperture 8. The vertex of projection of the weight-receiving member 15 is positioned above the gravity center of the slider 6, and the posture of the slider 6 can be freely controlled on its posture correspondingly to the motion of the medium revolving at high speed, and thereby the distance between the medium and the slider 6 can be kept constant. According to such a configuration, the recording and reading with stable signals can be performed with high reliability.

Embodiment 3

Figure 4:
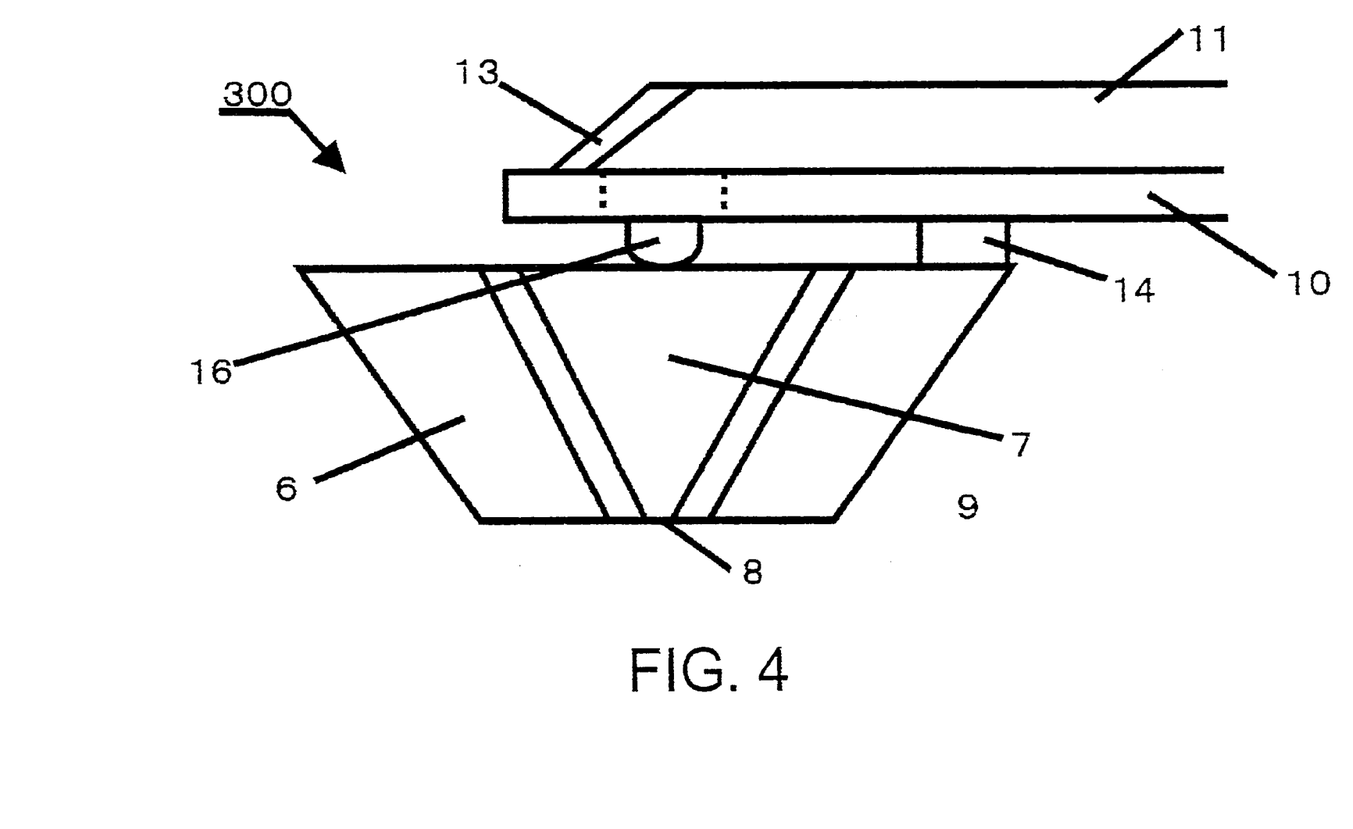
FIG. 4 is a diagram showing a structure of the optical head according to the embodiment 3 of the present invention.

FIG. 4 shows a structure of the optical head according to the embodiment 3 of the present invention. Although the optical head 300 of this structure is similar to the embodiment 1, it is characterized in that a portion of the in-arm optical waveguide 11 has a hemispherical shape, the portion being a weighting member 16. As a result, since more light can be condensed to be supplied to the minute aperture 8 by the lens effect of the hemispherical shape, more light can be irradiated on the recording medium. Also in the optical head 300 of this structure, since a point of the spherical body contacts the in-slider optical waveguide 7 and applies a loading force to it, the slider 6 can respond freely to the motion of the medium and keep the relative distance to the medium constant. Accordingly, since the relative positions of the arm 10 and the slider 6 do not vary, the light from the arm 10 side can be supplied constantly. As a result, the SN ratio of the light signal is further improved and an apparatus having high reliability can be produced. Also in FIG. 4, the in-arm optical waveguide 11 may be formed anywhere of the arm 10, i.e., on top of, in or under the arm 10.

Moreover, as in FIG. 3 showing the embodiment 2, the spherical shape formed of a portion of the optical waveguide may be formed on the in-slider optical waveguide 7 instead, though not shown in figure. Also in this case, it has the same effect and an apparatus having high reliability can be produced.

Embodiment 4

Figure 5:
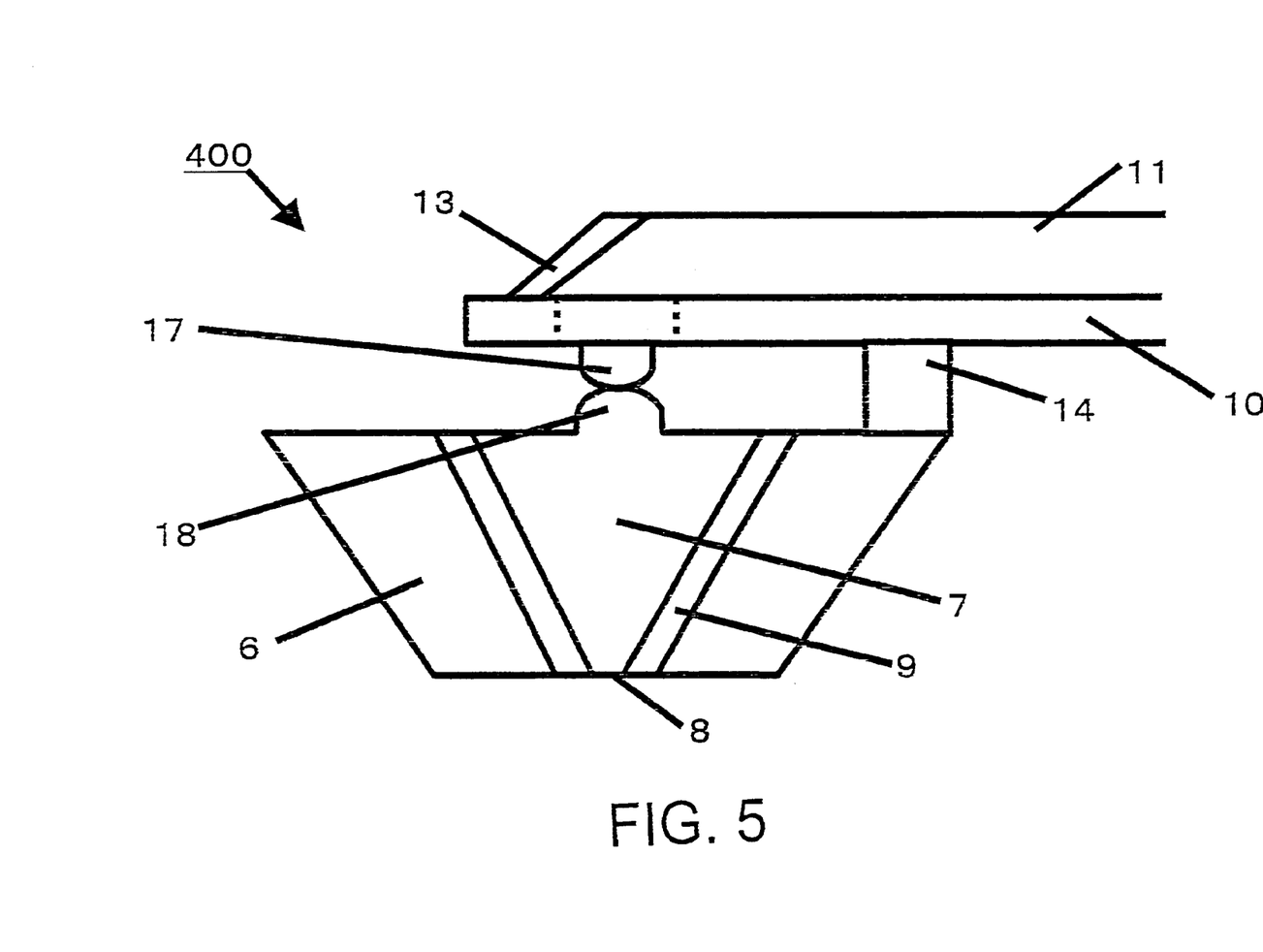
FIG. 5 is a diagram showing a structure of the optical head according to the embodiment 4 of the present invention.

FIG. 5 shows a structure of the optical head according to the embodiment 4 of the present invention. Although, in the embodiments 1 through 3, a protrusion or a partial sphere is formed either on the in-slider optical waveguide or on the in-arm optical waveguide, in the optical head 400 shown in the embodiment 4, there exist those members provided on both sides, such as a weighting member 17 formed on the in-arm optical waveguide 11 and a weight-receiving member 18 formed on the in-slider optical waveguide 7, respectively, and those members are contacting each other. Although those members are shown as hemispheres in FIG. 5, they may be replaced by protrusions, of course. Moreover, it may be configured such that the one is a hemisphere and the other is a protrusion. In this case, the lens effect of the hemispherical shape is further amplified and more amount of light can be condensed to the minute aperture 8. As the result, since the quantity of near-field light generated by the aperture can be increased, more improvement in SN ratio can be expected. Since it is a matter of course that the slider 6 is receiving the loading force at one point, similarly to the above, a free posture control can be conducted, and an apparatus having the structure with high reliability in the light signals can be realized, by the supply of stable light given by the contact between both the optical waveguides and by the effect of light-condensing by a lens effect. Also in FIG. 5, the in-arm optical waveguide 11 may be formed anywhere of the arm 10, i.e., on top of, in or under the arm 10, similarly to the above.

Embodiment 5

Figure 6:
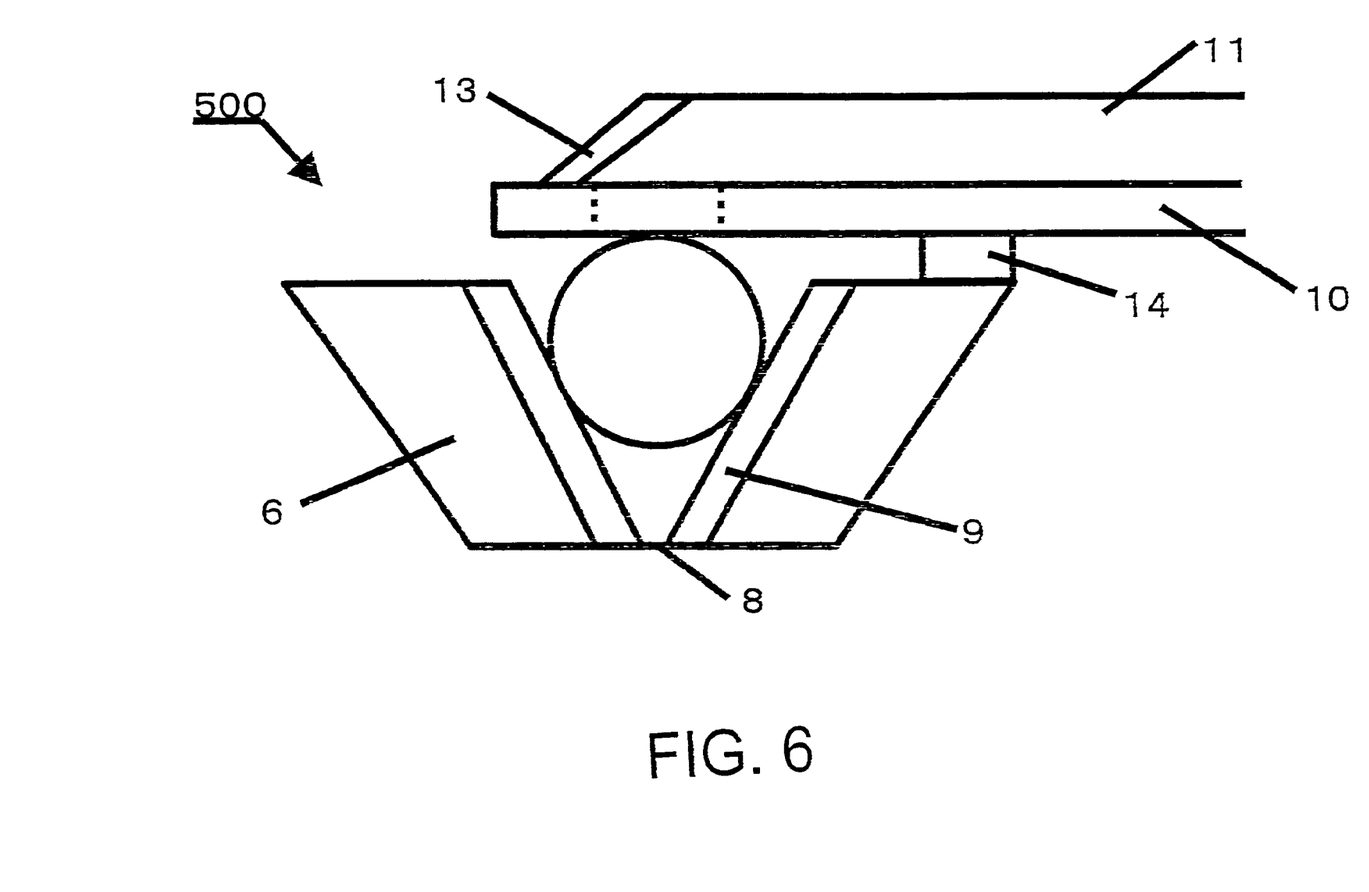
FIG. 6 is a diagram showing a structure of the optical head according to the embodiment 5 of the present invention.

FIG. 6 shows a structure of the optical head according to the embodiment 5 of the present invention. In an optical head 500, an inverse-conical hole is formed on a silicon substrate, which is the parent body of the slider 6, so that a minute aperture 8 comes to the vertex of the conical hole. A function of condensing light on the minute aperture 8 is provided by forming a light-reflecting layer 9 inside the hole. Inside the conical hole, a spherical lens 19 is inserted, and a loading force, which is given by the in-arm optical waveguide 11, is applied to the slider 6. Although the spherical lens 19 contacts with the inner wall of the hole in the slider and the in-arm optical waveguide, respectively, it can revolve freely and thereby enables the slider 6 to vary its posture with following the motion of the medium, and, with the flying-head technology, the slider 6 can be always kept in a certain relative position with respect to the medium.

Furthermore, by a lens effect of the sphere, much amount of light can be condensed on the minute aperture 8, and in turn, much amount of light can be irradiated from the minute aperture 8 on the medium. Consequently, since the signal level is stabilized by keeping uniformly the distance from the near-field light having a light intensity distribution, and SN ratio is improved by increasing the light intensity, an optical storing/reading apparatus having high reliability can be realized.

Embodiment 6

Figure 7:
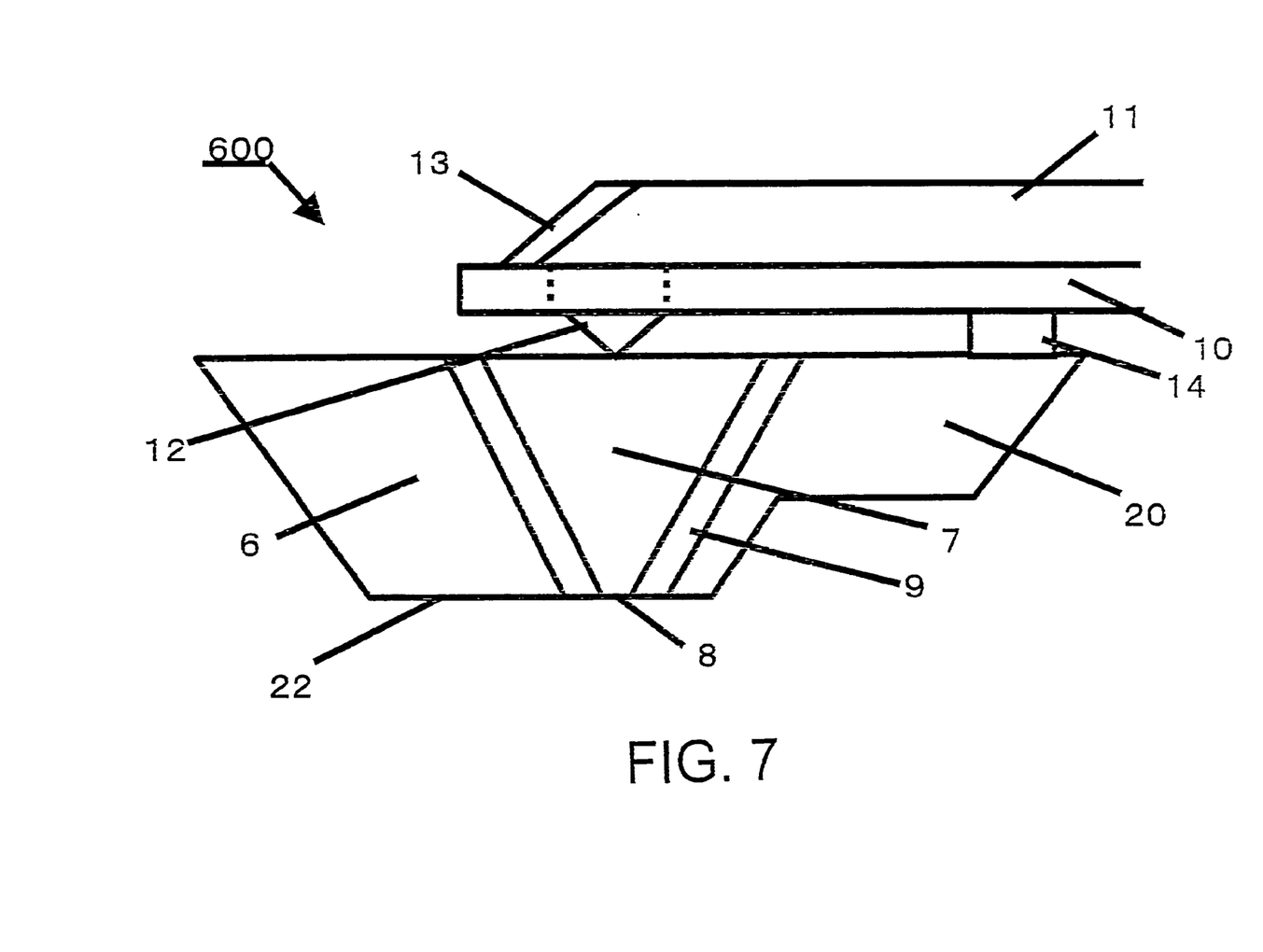
FIG. 7 is a diagram showing a structure of the optical head according to the embodiment 6 of the present invention.

FIG. 7 shows a structure of the optical head according to the embodiment 6 of the present invention. The optical head 600 of this structure is similar to the optical head 100 of the embodiment 1 shown in FIG. 2, except that the slider 6 has a surface opposing to the medium (surface 22 facing the medium), which is recessed partly with leaving a protruded portion 20 an the trailing edge side of the slider 6. The thickness of the slider 6 at the position where the slider 6 is connected with the arm 10 via the holding member 14 (thickness of the protruded portion 20) is thinner than that of the slider 6 at the position where the loading force is applied via the weighting member 12. The weighting member 12 is applying a loading force is applying a loading force at the point pushing the gravity center of the slider 6, so that the slider 6 can always keep a certain relative position according to the undulation of medium. The light, which has propagated through the in-arm optical waveguide 11 and was reflected by the light reflector surface 13, propagates to the minute aperture 8 through the weighting member 12. For the purpose of this, the position of the minute aperture 8 is determined to be a point nearly close to the gravity center in the surface 22 facing the medium. In the optical head 600 according to the embodiment 6, the gravity center of the slider 6 shifts by cutting a part of the surface 22 facing the medium of the slider 6, and thereby the minute aperture 8 comes closer to the trailing edge side of the surface adjacent to the medium (surface 22 facing the medium). By adjusting the shape of the slider 6 in this manner, the minute aperture 8 can be disposed at desired position on the surface opposing to the medium (surface 22 facing.the medium). Here, the ratio of the thickness of the protruded portion 20 to that of the slider 6 at the minute aperture must be 9/10 or less, so that the slider 6 does not have an influence on the air flow when the slider 6 is floating above the medium, or that the aperture can be brought close to the medium, with preventing a part of the protruded portion 20 from hitting the medium.

Figure 8:
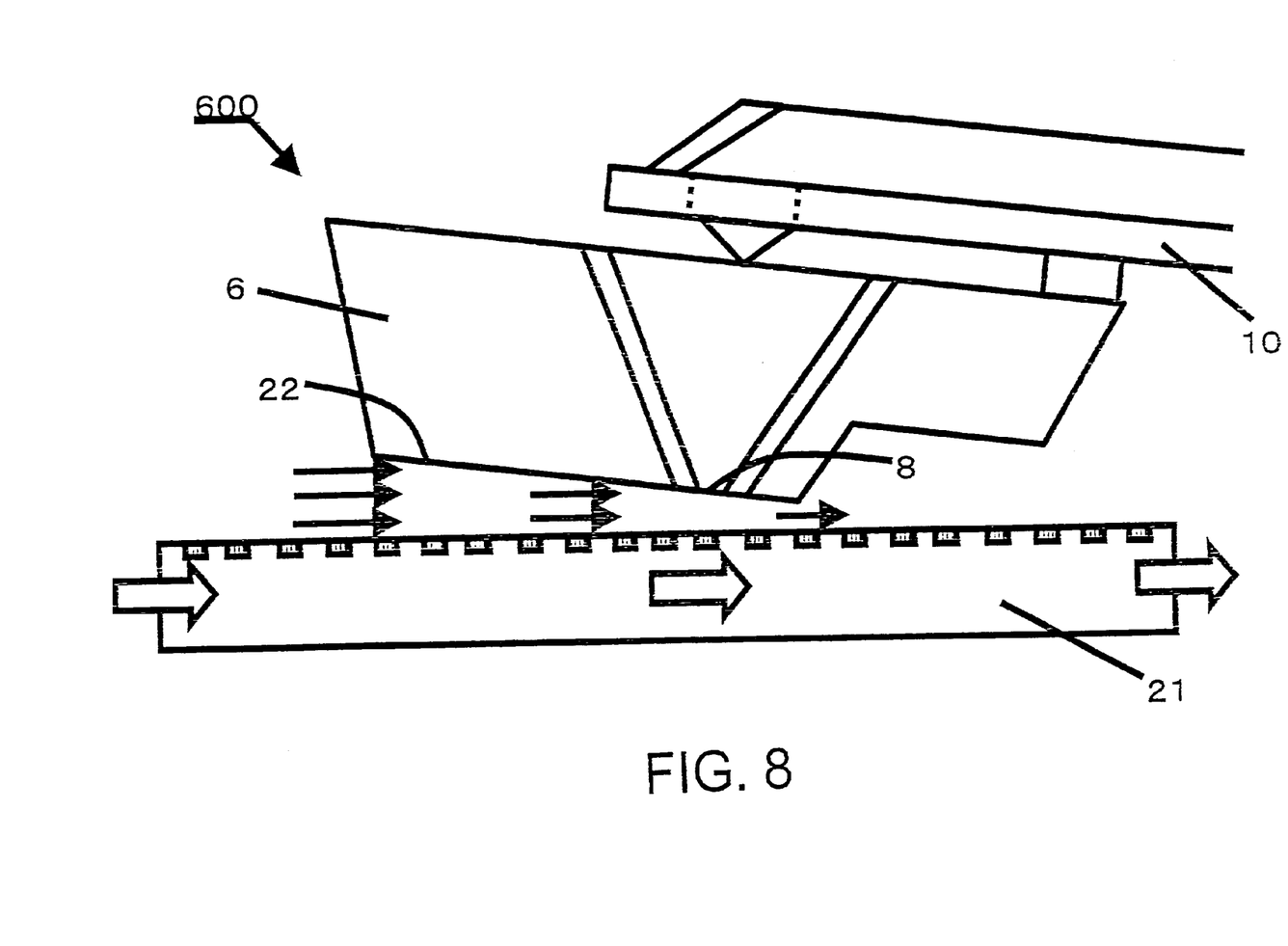
FIG. 8 is a diagram showing a positional relationship between the optical head and the medium, according to the embodiment 6 of the present invention.

FIG. 8 shows a positional relationship of the slider 6 with respect to the medium 21, when the optical head 600 according to the embodiment 6 of the present invention is scanned over the medium 21 revolving at high speed. Although the slider 6 receives a buoyant force by the hydrodynamic motion of air when the medium 21 revolves at high speed, it is possible to keep the distance from the surface of the medium 21 constant, by applying a loading force from the arm 10 to the slider 6. The posture of the slider 6 under such a situation is shown in FIG. 8. When the medium 21 runs in a direction shown by outlined arrows in FIG. 8, air flow is generated between the medium 21 and the slider 6 in the direction shown by solid arrows in FIG. 8. At the entrance, the surface 22 facing the medium receives a strong pressure toward the direction perpendicular to the medium, and the gap from the medium 21 is expanded at the leading edge of the slider 6. This causes the slider 6 to incline, and, at the exit of the air flow at the trailing edge of the slider 6, the distance between the surface 22 of the slider 6 facing the medium and the medium 21 becomes a minimum value. Since the minute aperture 8 is formed closer to the trailing edge at the area where the distance from the medium 21 is small, the minute aperture 8 comes closer to the medium 21, an SN ratio of the signal is improved and a high density read of information becomes possible. Assuming that the surface 22 facing the medium of the slider 6 has a size of 1 mm square and the minute aperture 8 is disposed within a range 0.4 mm or less from the edge of the surface 22 facing the medium of the slider 6, by employing the shape as in FIG. 7, where the protruded portion 20 is formed on the side of the slier, the gravity center of the slider 6 is shifted, and thereby, the minute aperture 8, which is disposed closer to the edge of the surface 22 facing the medium, comes to a point that is closer to the medium 21 when the medium revolves at high speed. It results an improvement of SN ratio, and an information recording apparatus further improved in high density, large capacity and small size can be realized.

Figure 9:
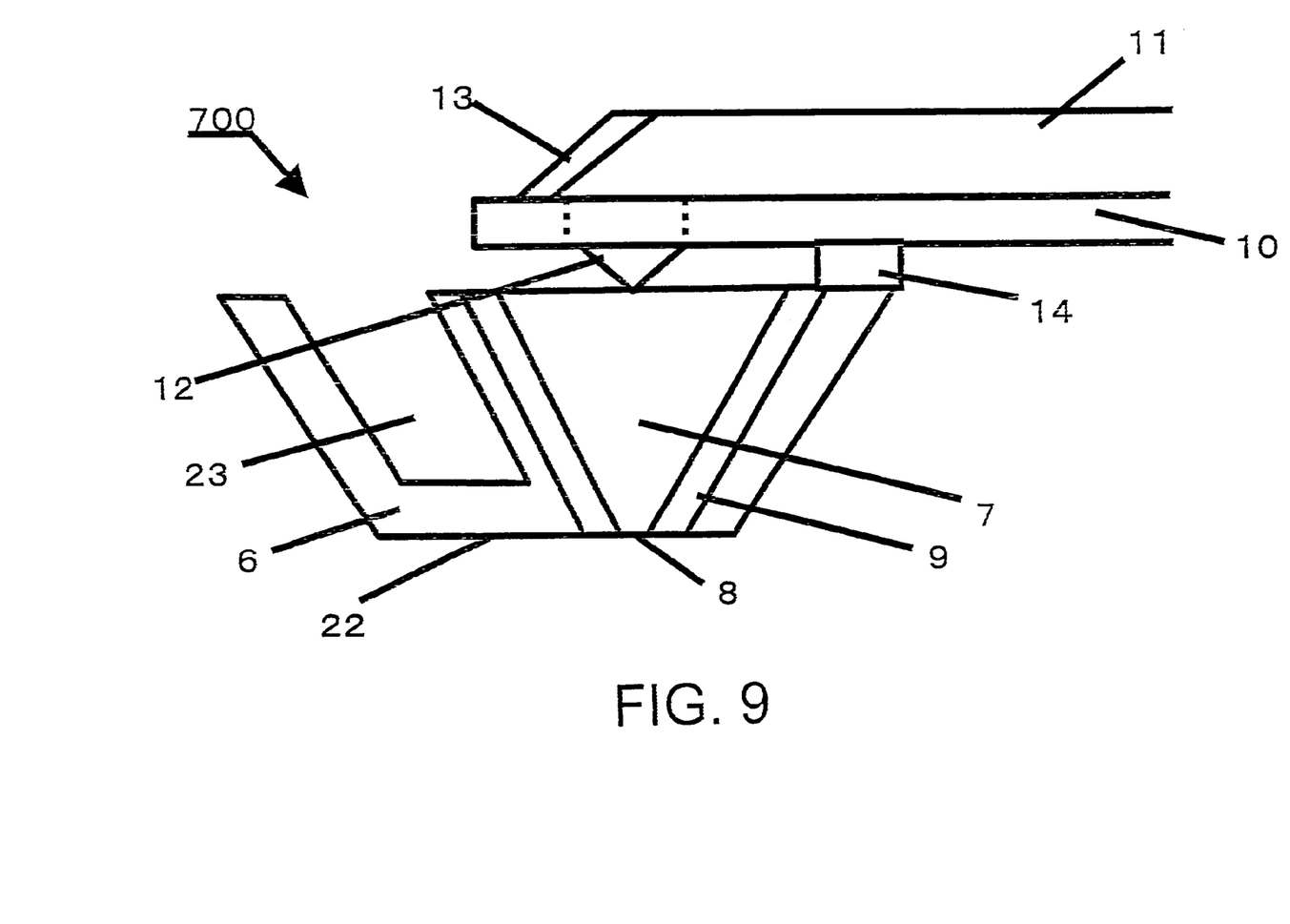
FIG. 9 is a diagram showing a structure of the optical head according to the embodiment 6 of the present invention.

FIG. 9 shows another example of the optical head 700 according to the embodiment 6 of the present invention. FIG. 9 is showing an optical head 700, in which the large part of the slider 6 is cut off to shift the gravity center of the slider 6. Although the slider 6 may be configured so as to dispose the minute aperture 8 at the edge of the surface opposite to the medium (surface 22 facing the medium), by cutting off the large part of the surface, as shown in FIG. 7, it may be also configured so as to dispose the minute aperture 8 at the end of the surface 22 facing the medium, by forming a large recess 23 in the surface opposite to the surface 22 facing the medium of the slider 6 to shift the gravity center of the slider 6, as shown in FIG. 9. In this case, by forming the recess 23 at the region that does not have an influence on the air flow during the high speed revolution, a stable floating height from the medium can be ensured, and there by an optical recording apparatus having high SN ratio and excellent reliability can be produced. Here, in order to bring the minute aperture 8 sufficiently close to the medium, the position of the minute aperture must be shifted from the center toward the end by at least 1/10 of the length of the surface 22 facing the medium. Accordingly, the dimensions of the recess 23 should be selected to be 1/5 or more of the volume of the slider 6.

Embodiment 7

Figure 10:
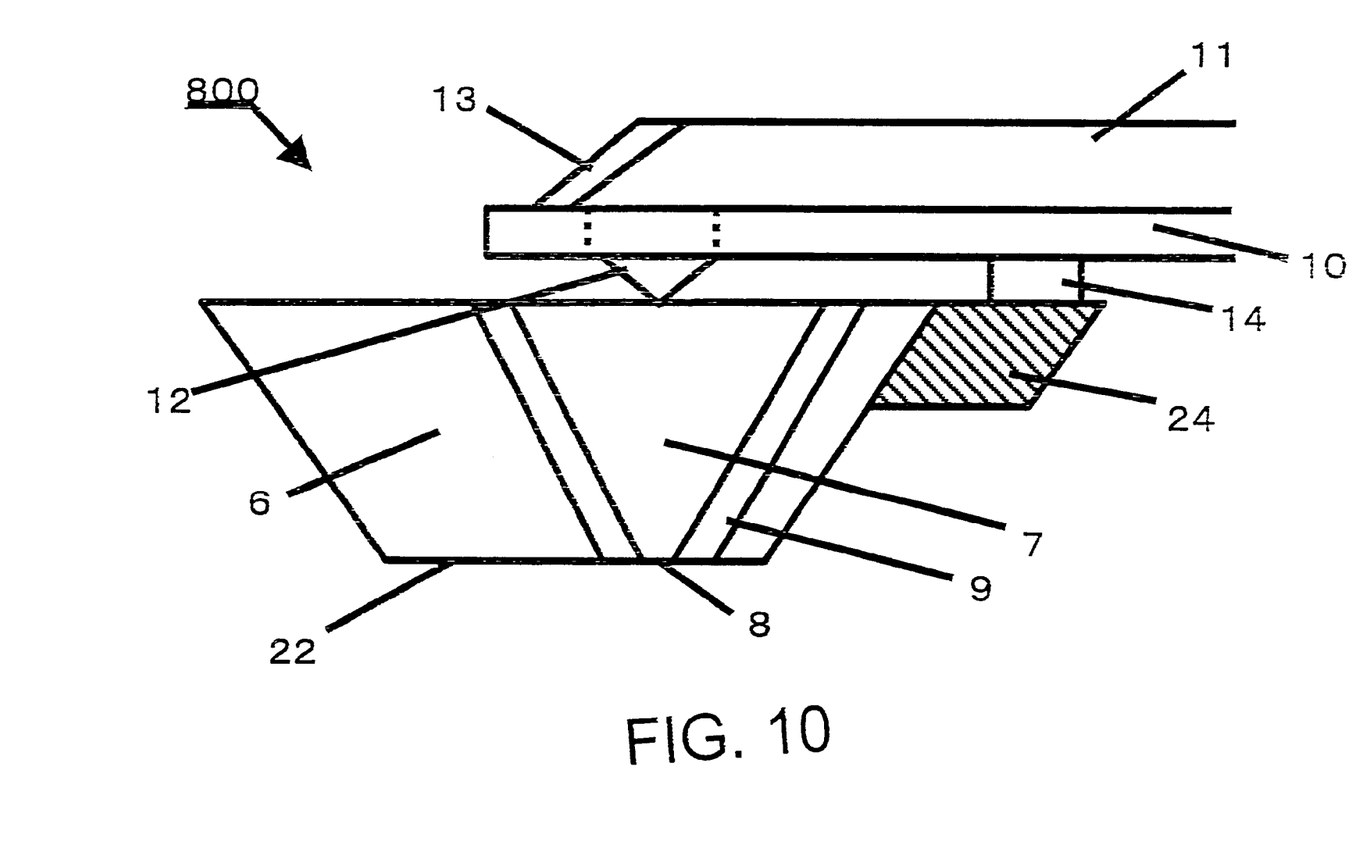
FIG. 10 is a diagram showing a structure of the optical head according to the embodiment 7 of the present invention.

FIG. 10 shows a structure of the optical head 800 according to the embodiment 7 of the present invention. This optical head 800 has a structure similar to the optical head 600 of the embodiment 6 shown in FIG. 7, except that a protruded portion 24 is formed of a material different from that composing the slider 6. For example, when the material composing the slider 6 is Si group or $SiO_2$ group, the protruded portion 24 may be formed of metal or epoxy group material. Since the density of different material will be different, the minute aperture 8, which is positioned close to the gravity center of the slider 6, comes to the edge in the surface 22 facing the medium, and thereby the distance from the medium can be made closer. Accordingly, the effect similar to that of the embodiment 6 can be obtained.

Figure 11:
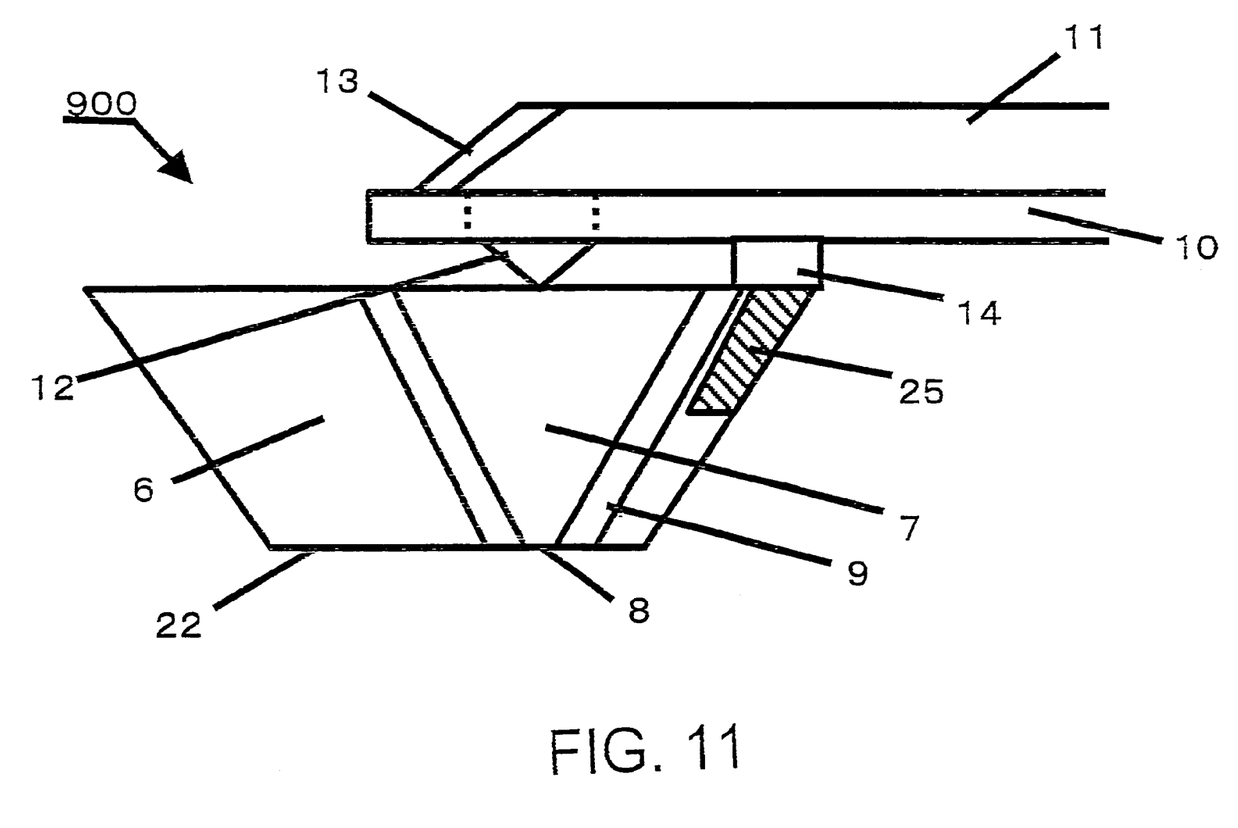
FIG. 11 is a diagram showing a structure of the optical head according to the embodiment 7 of the present invention.

Furthermore, the different material is not necessarily protruded, but it may be formed at a portion within the slider 6 as shown in FIG. 11. When the density of the different material 25 is higher than that of the material composing the slider 6, the minute aperture 8, which is positioned close to the gravity center, comes away from the center of the surface 22 facing the medium, and thereby the minute aperture 8 can be disposed in an area, where the distance from the medium is shorter. For example, if the main material of the slider 6 is Si, then this different material 25 may be copper, SUS, gold or the like, the density thereof is higher than that of Si. Contrary to that, even if an epoxy material, which has a density lower than that of Si, is used, the position of the minute aperture 8 can be shifted because of deviation of the gravity center.

Although, in the embodiments 6 and 7, the structure of the optical head has been described to be the optical head 100 according to the embodiment 1 shown in FIG. 2 as an example, it should not be limited to the optical head 100, but the structure may be any of the optical head 200 shown with the embodiment 2, the optical head 300 shown with the embodiment 3, the optical head 400 shown with the embodiment 4, and the optical head 500 shown with the embodiment 5.

Industrial Applicability

As described heretofore, according to the present invention, the structure is formed so that the slider can move freely in correspondence with the medium revolving at high speed to keep the distance between the medium and the slider always constant, and the intensity of the near-field light, which is generated by the minute aperture formed in the slider, is stabilized to be uniform. Accordingly, stable recording and reading of the information signals with using light can be realized, without the influence by the intensity distribution of the near-field light. Moreover, since a light condensing function is provided in the optical waveguide, a recording/reading method giving a high SN ratio and being excellent in reliability becomes possible. Furthermore, since the almost all components of the optical head according to the embodiment can be produced by micro-machining process with using Si or the like, the miniaturization of the entire apparatus can be achieved, and, at the same time, the cost reduction by the applicability of mass production can be realized.

Additionally, since the aperture can be disposed at an area, which is closer to the medium, within the surface facing the medium, without obstructing the free motion of the slider, SN ratio of signals is improved and thereby the stability and reliability of products can be improved. Moreover, by utilizing of a smaller aperture, reading from and writing to more minute areas can be carried out, and thereby the improvement in resolution and in high density information becomes possible. Furthermore, since, even if the power of light source is reduced, reading at a sufficiently high speed is possible, the miniaturization, thinned configuration and cost reduction of products can be achieved.

What is claimed is:

1. An optical head for recording and reading information, comprising:
   a slider that receives a buoyant force generated by undergoing relative motion with respect to a recording medium;
   a minute structure provided in a surface of the slider facing the recording medium for at least one of generating a near-field light or detecting a near-field light;
   an in-slider optical waveguide mechanism formed in the slider and connected optically with the minute structure for conveying light between the slider and the minute structure;
   an arm for holding the slider in close proximity to the recording medium and applying a loading force to the slider to counterbalance the buoyant force generated in response to the relative motion;
   an in-arm optical waveguide mechanism formed on the arm for guiding a light from the arm to the in-slider optical waveguide mechanism; and
   an optical waveguide mechanism in optical and mechanical contact with the in-arm optical waveguide mechanism and the in-slider optical waveguide mechanism, the loading force being applied to the slider through the optical waveguide mechanism.

2. An optical head according to claim 1; wherein the optical waveguide mechanism and the in-arm optical waveguide mechanism are an integral body.

3. An optical head according to claim 1; wherein the optical waveguide mechanism: and the in-slider optical waveguide mechanism are an integral body.

4. An optical head: according to any one of claims 1 through 3; wherein at least one of the areas of the optical waveguide mechanism that are in contact with the in-arm optical waveguide mechanism and the in-slider optical waveguide mechanism is extremely small.

5. An optical head according to claim 1; wherein the optical waveguide mechanism contacts the in-arm optical waveguide mechanism at one point and contacts the in-slider optical waveguide mechanism at a different point.

6. An optical head according to claim 1; wherein the optical waveguide mechanism extends from the slider mechanism, is shaped as a cone or a hanging bell having a pointed top, and contacts the in-arm optical waveguide mechanism at the pointed top thereof.

7. An optical head according to claim 1; wherein the optical waveguide mechanism extends from the slider mechanism, is shaped as part of a sphere, and contacts the in-arm optical waveguide mechanism at a part of the spherical surface.

8. An optical head according to claim 1; wherein the optical waveguide mechanism has a light condensing function.

9. An optical head according to claim 1; wherein the loading force is applied toward a center of gravity of the slider, and the minute structure provided in the surface facing the recording medium is disposed on a straight line which links a point at which the slider receives the loading force with the center of gravity of the slider.

10. An optical head according to claim 9; wherein a shape, a density or a combination of the shape and density of the slider is determined so that the minute structure is disposed closer to an edge of the surface facing the recording medium.

11. An optical head according to claim 10; further comprising a recess provided in the slider, the recess having a volume of $1/5$ or more of a volume of the slider and being formed in a surface of the slider opposite the surface of the slider facing the recording medium.

12. An optical head according to claim 10; wherein a surface of the slider facing the recording medium has a difference in thickness of at least $1/10$ of an averaged thickness of the slider.

13. An optical head according to claim 10; wherein a material having a density different from that of a remainder of the slider occupies $1/10$ or more of a total volume of the slider.

14. An optical head according to claim 1; wherein the optical waveguide mechanism extends from the arm, is shaped as a cone or a hanging bell having a pointed top, and contacts the in-slider optical waveguide mechanism at the pointed top thereof.

15. An optical head according to claim 1; wherein the optical waveguide mechanism extends from the arm, is shaped as part of a sphere, and contacts the in-slider optical waveguide mechanism at a part of the spherical surface.

16. An optical head for at least one of recording and reading data, comprising:
   a slider spaced by a small gap from a recording medium during use of the optical head for reading and/or writing data on the recording medium, the small gap being provided by a buoyant force produced when the slider undergoes relative motion with respect to the recording medium;
   a minute aperture formed in a surface of the slider facing the recording medium for at least one of generating or scattering near-field light;
   an in-slider optical waveguide formed in the slider for conveying light therethrough to or from the minute aperture;
   an arm for holding the slider in close proximity to the recording medium and applying a loading force to the slider to counterbalance the buoyant force generated in response to the relative motion;
   an in-arm optical waveguide formed on the arm for guiding light from the arm to the in-slider optical waveguide;
   a holding member for attaching the slider to the arm; and
   an optical waveguide mechanism in optical and mechanical contact with the in-arm optical waveguide and the in-slider optical waveguide for conveying light between the in-arm optical waveguide and the in-slider optical waveguide and applying the loading force to the slider.

17. An optical head according to claim 16; wherein the optical waveguide mechanism extends from the arm and has a conical shape with a sharpened tip, the tip being in contact with the in-slider optical waveguide.

18. An optical head according to claim 17; wherein the optical waveguide mechanism condenses light from the arm and projects the condensed light to the in-slider optical waveguide.

19. An optical head according to claim 17; wherein the optical waveguide mechanism expands light from the in-slider optical waveguide and projects the expanded light to the in-arm optical waveguide.

20. An optical head according to claim 16; wherein the optical waveguide mechanism extends from the arm, has a portion provided with a spherical shape, and is in contact with the in-slider optical waveguide at the portion having the spherical shape.

21. An optical head according to claim 20; wherein the optical waveguide mechanism condenses light from the arm and projects the condensed light to the in-slider optical waveguide.

22. An optical head according to claim 20; wherein the optical waveguide mechanism expands light from the in-slider optical waveguide and projects the expanded light to the in-arm optical waveguide.

23. An optical head according to claim 16; wherein the holding member connects the slider to the arm at a trailing edge side thereof, and the slider has a larger thickness at a leading edge side thereof than at the trailing edge side thereof so that when the slider undergoes relative motion with respect to the recording medium, a torque produced by the buoyant force does not cause the trailing edge side of the slider to come into contact with the recording medium.

24. An optical head according to claim 23; wherein the minute aperture is formed closer to the trailing edge side of the slider than to the leading edge side thereof so that the minute aperture is urged closer to the recording medium by the torque.

* * * * *